United States Patent
Cassanova

(10) Patent No.: US 8,538,696 B1
(45) Date of Patent: Sep. 17, 2013

(54) PROVIDING WEATHER DATA FOR A LOCATION USING WEATHER DATA STORED FOR A FINITE NUMBER OF LOCATIONS

(75) Inventor: William Anthony Cassanova, Marietta, GA (US)

(73) Assignee: The Weather Channel, LLC, Atlanta, GA (US)

(*) Notice: Subject to any disclaimer, the term of this patent is extended or adjusted under 35 U.S.C. 154(b) by 292 days.

(21) Appl. No.: 11/860,695

(22) Filed: Sep. 25, 2007

(51) Int. Cl.
  G01W 1/02 (2006.01)
  G01W 1/04 (2006.01)
  G01W 1/06 (2006.01)
  G01B 11/03 (2006.01)

(52) U.S. Cl.
  USPC .................. 702/3; 702/5; 702/16; 702/36

(58) Field of Classification Search
  USPC .............. 702/4, 55, 100, 142, 150, 179, 182, 702/183; 382/154; 700/259; 709/217, 219
  See application file for complete search history.

(56) References Cited

U.S. PATENT DOCUMENTS

| | | | |
|---|---|---|---|
| 6,240,369 B1* | 5/2001 | Foust | 702/3 |
| 6,456,737 B1* | 9/2002 | Woodfill et al. | 382/154 |
| 6,754,585 B2* | 6/2004 | Root et al. | 702/3 |
| 6,829,536 B2* | 12/2004 | Moore | 702/3 |
| 7,019,693 B2* | 3/2006 | Spirito | 342/462 |
| 7,082,382 B1* | 7/2006 | Rose et al. | 702/183 |
| 7,646,328 B2* | 1/2010 | Makkapati et al. | 342/26 R |
| 7,702,427 B1* | 4/2010 | Sridhar et al. | 701/4 |
| 2002/0112026 A1* | 8/2002 | Fridman et al. | 709/217 |

OTHER PUBLICATIONS http://www.vizrt.com/db/106/7/90/document37.ehtml, Jan. 26, 2007.

* cited by examiner

*Primary Examiner* — Michael Nghiem
*Assistant Examiner* — Felix Suarez
(74) *Attorney, Agent, or Firm* — Meunier Carlin & Curfman, LLC

(57) ABSTRACT

Methods and systems of the invention provide appropriate weather data for a location by associating it with a location or locations for which weather data is stored. Such stored data may have been collected from one or multiple weather data sources. An image or video may be associated with weather data selected from near-current stored weather data for one or more nearby locations. Certain methods also allow observation and/or forecast weather data for any specified location to be provided using stored weather data for a finite number of locations from one or more weather data sources. For example, the location coordinates of a specified location may be used to determine an appropriate location (exact or substitute) for which weather data was previously collected and stored.

19 Claims, 4 Drawing Sheets

---

600

CREATING A SEGMENT ASSOCIATED WITH LOCATION COORDINATE INFORMATION
610

PRODUCING THE VIDEO BY COMBINING CAPTURED VIDEO IMAGES, THE SEGMENT, AND NEAR PRODUCTION TIME WEATHER DATA ASSOCIATED WITH THE SEGMENT
620

RETRIEVING NEAR PRODUCTION TIME WEATHER DATA:
(A) IN RESPONSE TO A USER ACTION;
(B) FROM A DATABASE OF WEATHER DATA; AND
(C) USING LOCATION COORDINATE INFORMATION
630

PROVIDING WEATHER DATA FOR A LOCATION USING WEATHER DATA STORED FOR A FINITE NUMBER OF LOCATIONS

RELATED FIELDS

The invention relates to systems that approximate weather data for a specified location, and more specifically, relates to providing such weather data using weather data that is periodically collected and stored for a finite number of locations.

BACKGROUND

There are various sets of observed weather data available from different sources for different sets of weather data locations. For example, the National Weather Service, along with other public providers like the Federal Aviation Administration and Department of Defense, produce over a thousand surface weather observations each hour (or more frequently, as conditions warrant) in the continental United States. In addition, some private firms have installed weather instruments that augment the official network of government-provided weather observations.

There are also various sets of derived weather data for still different sets of weather data locations. For example, U.S. Pat. No. 7,082,382, incorporated herein by this reference, describes methods for estimating or deriving weather observations/conditions for any given location using observed weather conditions from neighboring locations, radar data, lightning data, satellite imagery, etc. Such estimating and deriving techniques may be used to periodically determine weather data for a set of weather data locations. For example, The Weather Channel® network, recently launched its HiRad (High Resolution Aggregated Data) technology that periodically calculates weather data for 1000 times more locations than was previously available, providing another set of periodically stored weather data.

Current systems and methods do not fully utilize the many sources of periodically stored weather data and have limited capabilities, if any, for providing near real-time weather data (observations or approximations) about locations for which weather data is not stored. A variety of situations exist where a particular location is specified for which the quick retrieval or calculation of an approximation of the current weather conditions or forecasts is desired. For example, it may be desirable for an on-camera meteorologist (OCM) to be able to discuss a map during a live video show and retrieve current weather data for the particular location depicted on the map. In such a case, it would be desirable to be able to quickly retrieve the most appropriate weather data for the selected location. Accordingly, there is a need for systems and methods that can quickly select approximate weather data for a specified location by associating the selected location with a location or locations for which weather data has been collected and stored from one or more weather data sources.

SUMMARY

The invention provides observation and/or forecast weather data for any specified location using stored weather data (preferably stored in a single database) for a finite number of locations from one or more weather data sources. Weather data that is provided for a specified location may be exact data for the precise location, for example, where the specified location is a location for which data is stored. Weather data that is provided for a specified location may also be approximate data, for example, where data for a nearby location is used as a substitute for data from the specified location or to derive such data. Accordingly, an embodiment of the present invention involves using the location coordinates of the specified location to determine an appropriate location (exact or substitute) for which weather data was previously collected and stored. Embodiments, including those in which source weather data is collected from multiple sources, offer the advantage of providing more robust, complete, and accurate weather data for given specified areas. Embodiments, including those in which weather data is retrieved from a single database without requiring calculation or derivation, offer the advantage of providing near-real time access to weather data for a specified location. Other embodiments and advantages will be apparent in view of the following description.

DETAILED DESCRIPTION OF FIGURES

Methods and systems of the invention provide appropriate weather data for a location by associating it with a location or locations for which weather data is stored after being collected from one or multiple weather data sources. Observation and/or forecast weather data are determined for any specified location using stored weather data (preferably stored in a single database) for a finite number of locations from one or more weather data sources. The location coordinates of the specified location may be used to determine one or more appropriate locations (exact or substitute) for which weather data was previously collected and stored.

Figure 1:
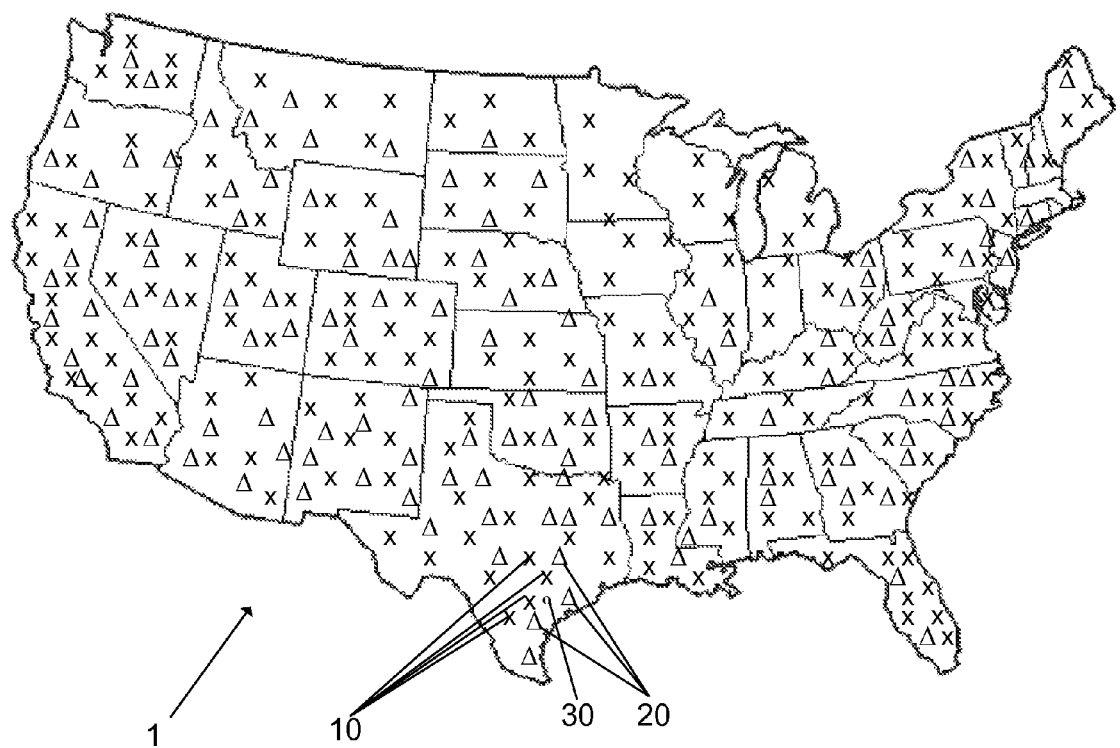
FIG. 1 is a map illustrating the location of a specified location and other locations for which weather data is stored.

FIG. 1 illustrates a map 1 showing example locations 10, 20 for which weather data is stored. Information may be collected for each of these locations 10, 20 and periodically stored in a database. Such information may be collected from one or more different information systems. For example, using the locations illustrated in FIG. 1, the "x" locations 10 could be retrieved from the surface weather observations produced by the Aviation Administration and Department of Defense each hour and the "Δ" locations 20 in FIG. 1 could be retrieved from values periodically calculated with The Weather Channel's HiRad technology. The locations shown in FIG. 1 are exemplary points not meant to illustrate actual collection locations. As indicated above, HiRad and other weather data systems may offer many more locations than those depicted in FIG. 1.

Weather data that is "near-current," meaning that it is associated with recent weather, may be collected from multiple weather data observation and other systems. Such collected weather data may be stored in one or more databases or in any other suitable electronic or computer format for use in accordance with various aspects of the present invention. Such stored data may be stored with or associated with information about the observation location. For example, near-current weather data for a location may be stored in a database along with latitude and longitude information that identifies, to any appropriate level of granularity, the location for which the real or virtual data/observations are associated. Note that near-weather information may be derived, such as information that is derived by The Weather Channel's HiRad technology, and thus is in a sense a "virtual" observation.

Embodiments of the invention utilize near-current weather data about a finite number of locations for which real or virtual weather observation information is periodically collected or otherwise retrieved. An embodiment of the present invention involves collecting such near-current weather data from one or more systems and storing it in one or more electronic systems that can be conveniently and quickly accessed for a variety of purposes, as explained in greater detail herein. In such embodiments, because underlying systems may periodically update both measured and virtual observations, near-current weather data should be periodically retrieved from such systems to refresh the stored weather data with near-current weather data. Data from different systems may correspond to data from different observation times and may be weighted or selected from accordingly.

FIG. 1 further illustrates a selected location 30 for which near-current weather data is desired. In one embodiment, selected location 30 is associated with a graphic such as a map or video that is intended to be used in presenting a weather report. For example, a television meteorologist may select a graphic, such as a map of a metro area showing a particular location, and plan to use the map as a demonstrative while making a televised or otherwise video taped weather report. At the time of making the televised weather report, near real time weather data may be retrieved for inclusion in the weather report (e.g., weather data may be provided for the meteorologist to verbalize or the weather data may appear in text format as part of the television program). The retrieved weather data is retrieved from (or derived from data retrieved from) the near-real time weather data from the one or more observation or virtual observation systems.

In one embodiment of the present invention, location coordinates, e.g., longitude and latitude coordinates, associated with the selected location 30 are used to select one or more locations for which near-current weather data is stored or is obtainable, such as weather locations 10, 20 depicted in FIG. 1. For example, the latitude and longitude of selected location 30 could be compared with the latitude and longitude of locations 10, 20 for which near-current weather data is stored or is obtainable, and the location 10, 20 that is closest is selected as a proxy location, in the sense that the near-current weather data for that location is used as approximate data for the selected location 30.

As another example, the latitude and longitude of selected location 30 could be compared with the latitude and longitude of locations 20, 30 for which near-current weather data is stored or is obtainable, and the two locations 10, 20 that are closest are selected and averaged to yield approximate data for the selected location 30.

As another example, the latitude and longitude of selected location 30 could be compared with the latitude and longitude of one or more other locations 20, 30 for which near-current weather data is stored or is obtainable, and one or more locations 10, 20 may be selected based on a rule or algorithm that weighs latitude and longitude differently. In addition, data from different sources is not necessarily given equal weight. For example, data from a system that updates every few minutes may be given more weight than data from a system that updates less frequently. Likewise, data from a system providing only observation may be given greater weight than data from a system that provides data for virtual locations. A variety of other suitable techniques for selecting one or more locations 10, 20 to use will be understood by those of skill in the art.

Figure 2:
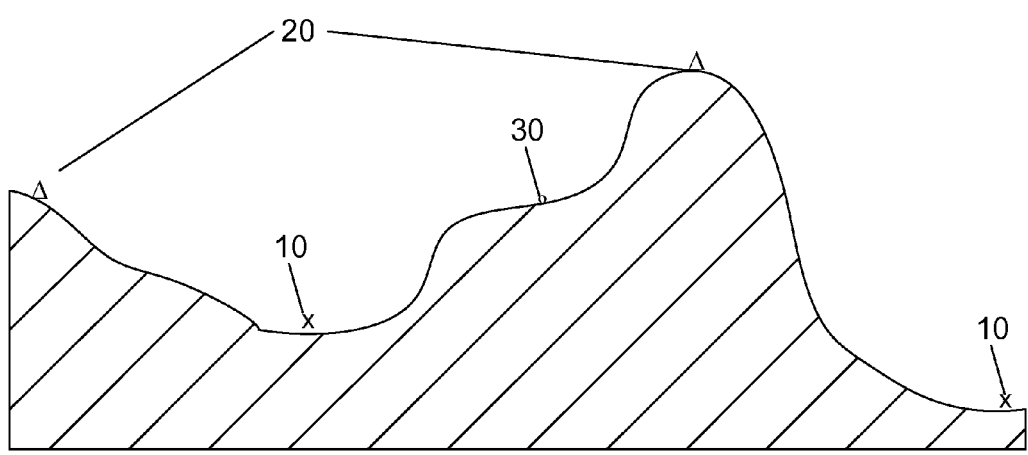
FIG. 2 is an illustration of the elevation of a specified location and other locations for which weather data is stored.

FIG. 2 illustrates the elevation of a specified location and locations for which weather data is stored. In one embodiment of the present invention, the location coordinates used to select one or more locations for which near-current weather data is stored or is obtainable include the longitude, latitude, and/or elevation associated with the selected location 30. For example, the latitude, longitude, and elevation of selected location 30 as shown in FIGS. 1 and 2 could be compared with those coordinates of neighboring locations 10, 20 for which near-current weather data is stored or is obtainable, and one or more locations that are appropriate for use or averaging is/are selected to provide the approximate weather data for the selected location 30. Other suitable techniques for selecting and using one or more locations 10, 20 will be understood by those of skill in the art.

Embodiments of the present invention, including those in which source weather data is collected from multiple sources, offer the advantage of providing more robust, complete, and accurate weather data for given specified areas. Embodiments, including those in which weather data is retrieved from a single database without requiring calculation or derivation, offer the advantage of providing near-real time access to weather data for a specified location. Other embodiments and advantages will be apparent in view of the following description.

Figure 3:
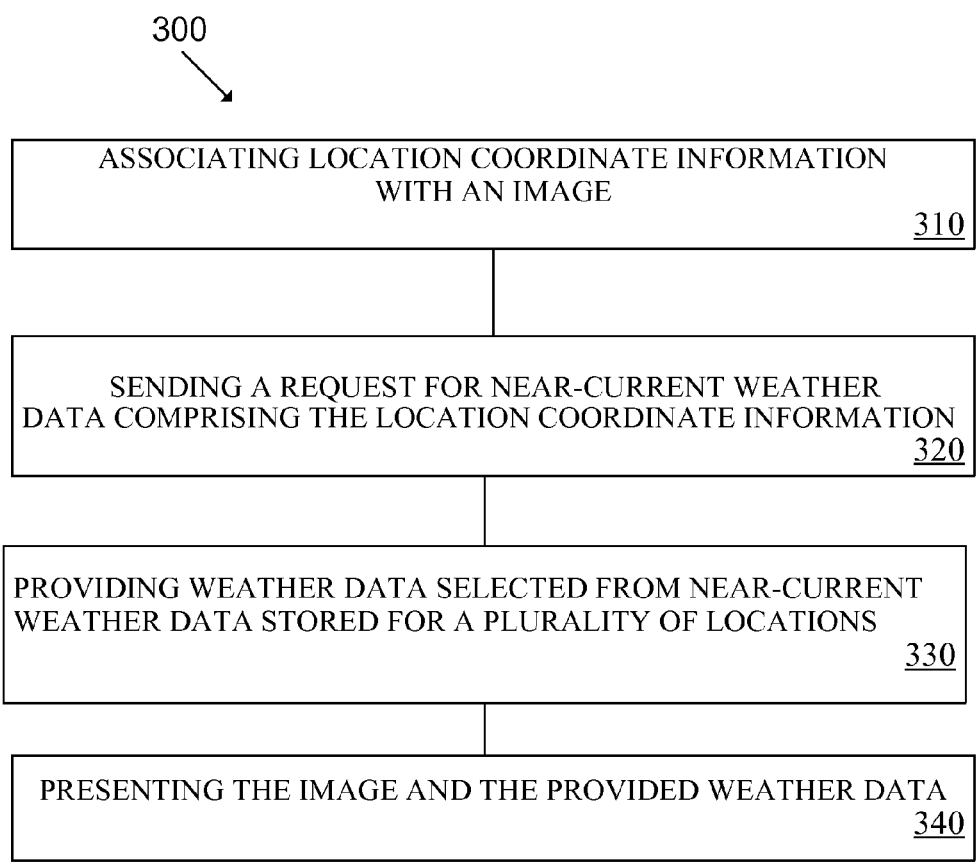
FIG. 3 illustrates a method of presenting an image and weather data according to an embodiment of the present invention.

FIG. 3 illustrates a method 300 of presenting an image and weather data according to an embodiment of the present invention. A variety of other implementations are also possible. In the method 300 shown in FIG. 3, location coordinate information is associated with an image, as shown in block 310. This association can be manually performed, for example, by a person intending to use the image in a television broadcast, or automatic, for example, by a computer recognition process that recognizes location coordinate information by associating the image with a geographic location. The image may comprise, for example, a map and the associated location coordinate information may comprise map coordinates, e.g., a numeric longitude value, a numeric latitude value, and/or a numeric altitude value. As another example, the image may comprise a video recording and the associated location coordinate information may comprise coordinates for the location at which the recording occurred. Such a video recording may be live.

In the method 300 shown in FIG. 3, a request for near-current weather data is sent including the location coordinate information associated with the image, as shown in block 320. Such a request may be initiated manually or automatically, for example, when an image is selected by an on-air personality for display. The request may automatically be sent. The request may have any suitable format including, for example, any suitable electronic message format.

In the method 300 shown in FIG. 3, in response to receiving the request, weather data is provided that was selected using near-current weather data stored for a plurality of locations, as shown in block 330. The selected weather data is selected using the location coordinate information associated with the image. As described herein, the selected weather data may be associated with or derived from weather data for one or more locations for which weather data is periodically stored. The weather data stored for a plurality of locations may comprise weather data retrieved from one or more of at least two different source weather data systems.

In the method 300 shown in FIG. 3, the image and the provided weather data are presented, as shown in block 340. For example, the image may be displayed on a television program and the provided weather data may be displayed in text form on or around the image. As another example, the image may be displayed on a television program and the on-air person may verbalize some or all of the provided weather data.

Figure 4:
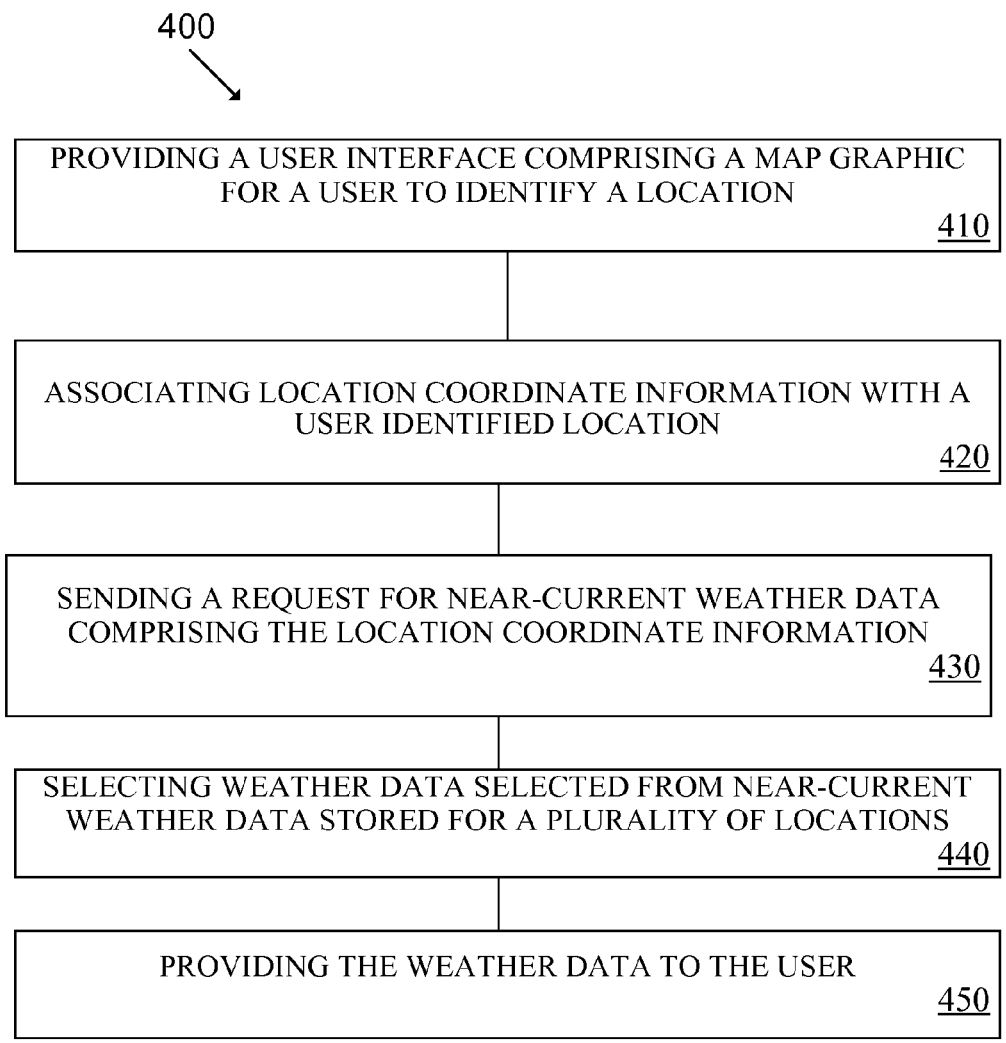
FIG. 4 illustrates a method of providing weather data to a user according to an embodiment of the present invention.

FIG. 4 illustrates a method 400 of providing weather data to a user according to an embodiment of the present invention. A variety of other implementations are also possible. In the method 400 shown in FIG. 4, a user interface comprising a map graphic is provided for a user to identify a location, as shown in block 410. For example, the user interface may allow the user to select a particular location on the map or allow the user to input a specific address, zip code, or specific latitude, longitude, and/or altitude coordinates.

In the method 400 shown in FIG. 4, location coordinate information is associated with a user identified location, as shown in block 420. For example, if the user has selected a particular point on a displayed map, the latitude and longitude of that position may be determined. The altitude may also be determined. As another example, if the user has selected a particular city name that appears on a map on the interface, a zip code associated with that city may be selected and location coordinate information for the center of that zip code may be associated with the user identified location.

In the method 400 shown in FIG. 4, a request for near-current weather data comprising the location coordinate information is sent, as shown in block 430. Such a request may be initiated manually or automatically and may have any suitable format including, for example, any suitable electronic message format.

In the method 400 shown in FIG. 4, weather data is selected from near-current weather data stored for a plurality of locations, as shown in block 440. The selected weather data is selected in response to receiving the request and using the location coordinate information associated with the user identified location. The weather data stored for a plurality of locations comprises weather data retrieved from one or more of at least two different source weather data systems.

In the method 400 shown in FIG. 4, the weather data is provided to the user, as shown in block 450. For example, the weather data may be sent in an electronic message to the user.

Figure 5:
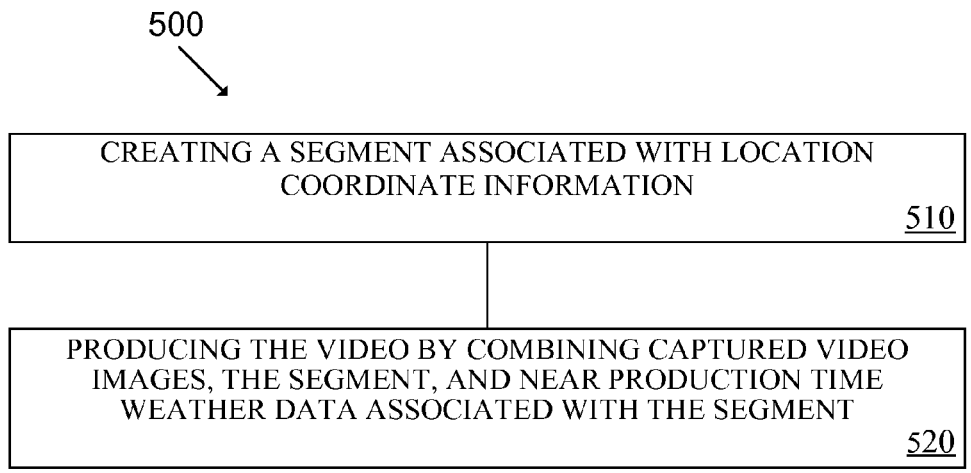
FIG. 5 illustrates a method of producing a video with near production time weather data according to an embodiment of the present invention.

FIG. 5 illustrates a method 500 of producing a video with near production time weather data according to an embodiment of the present invention. A variety of other implementations are also possible. In the method 500 shown in FIG. 5, a segment, such as a map, associated with location coordinate information is created, as shown in block 510. For example, an image comprising a representation of a particular location (i.e., having associated location coordinate information) is created. As another example, the location coordinate information associated with the segment may comprise a numeric latitude value and a numeric elevation value associated with a location on a map.

In the method 500 shown in FIG. 5, video is produced by combining captured video images, the segment, and near production time weather data associated with the segment, as shown in block 510. While the video images are being captured by a video camera, the near production time weather data may be retrieved simultaneously from a database of weather data using the location coordinate information associated with the segment. The database of weather data comprises weather data retrieved from one or more of at least two different source weather data systems. The produced video may comprise a single image (or series of images) providing for the simultaneous display of a captured video image, the graphic, and the near production time weather data.

Retrieving the near production time weather data may comprise determining that a location for which weather data is stored in the database is the nearest location to a location identified by the location coordinate information. Retrieving the near production time weather data may comprise comparing the location coordinate information with longitude, latitude, and elevation values of at least one location for which weather data is stored in the database. Such comparison may further comprise attributing greater significance to differences in elevation than to differences in longitude and latitude.

A metric space, such as an r-tree, may be used that comprises a set of elements corresponding to the locations for which weather data is stored in the database. The method 500 may further comprise retrieving the near production time weather data and further comprises comparing distances in the metric space.

Figure 6:
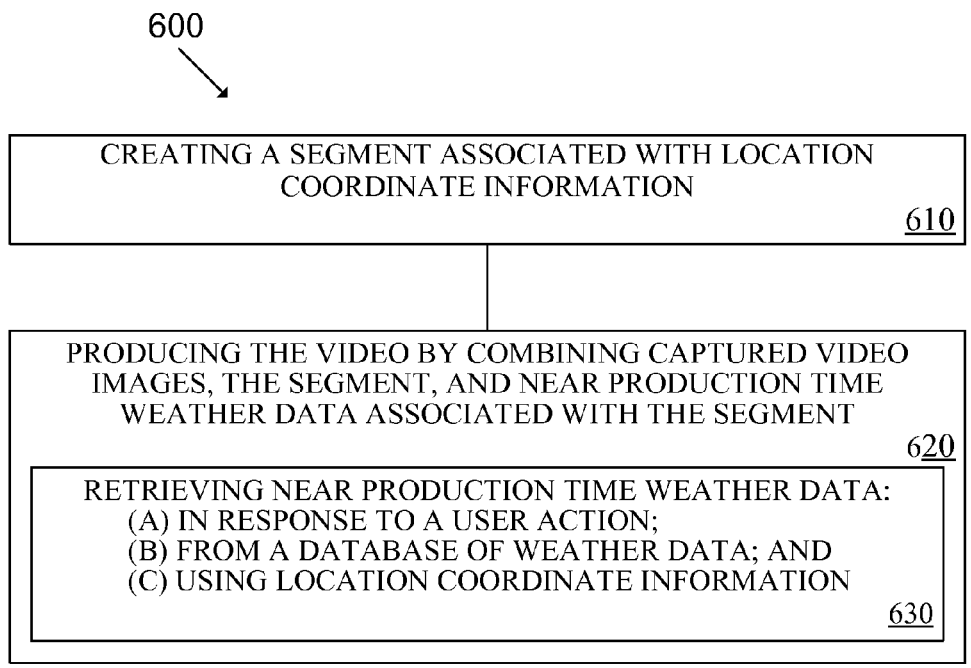
FIG. 6 illustrates a method of producing a video with near production time weather data according to an embodiment of the present invention.

FIG. 6 illustrates a method 600 of producing a video with near production time weather data according to an embodiment of the present invention. A variety of other implementations are also possible. In the method 600 shown in FIG. 6, a segment associated with location coordinate information is created, as shown in block 610.

In the method 600 shown in FIG. 6, video is produced by combining captured video images, the segment, and near production time weather data associated with the segment, as shown in block 620. As shown in block 630, the near production time weather data is retrieved: (a) in response to a user action; (b) from a database of weather data for a plurality of locations for which weather data is stored after being retrieved from one of at least two different source weather data systems; and (c) using the location coordinate information associated with the segment. The retrieval of the near production time weather data may further comprise determining which location for which data is stored is nearest a location identified by the location coordinate information associated with the segment and/or may involve the use of a metric space, such as an r-tree.

Exemplary Client/Server Environment

A variety of network configurations, including client-server configurations, may be used to facilitate embodiments of the invention. Certain aspects of the present invention may be implemented using a VizRT® data plug-in, that on a near real-time basis can be called by a client to interrogate a server or series of servers for observation data based on 2 dimensional (latitude-longitude) coordinates or 3 dimensional (latitude-longitude-elevation) coordinates. One advantage to such interrogation using coordinates is that the client application or person calling the plug-in is not constrained to specifying particular weather observation points. Instead one may specify a location by providing any coordinates, regardless of whether they exactly correspond to an observation point, and the interrogator servers will determine which observation (real or virtual) point(s) is/are most appropriate and return appropriate data.

As an exemplary configuration, a client may comprise a custom dynamic link library that extends a VizRT® supplied data extraction application programming interface (API). Upon a fetch request, the client connects to a remote server, for example, using a common object request broker architecture (CORBA) object request, and obtains the data and then converts the returned results to something that VizRT® can understand. In this example, the plug-in is not responsible for rendering the data, only obtaining it. Instead, VizRT® is used to render data and stores the necessary data once converted to an appropriate format.

A server component for use with the present exemplary network configuration may comprise separate components. For example, a naming service may be used to locate objects based on name, such objects representing the working unit of the application onto which function calls are made to retrieve data. Exemplary objects include observation-interrogator and forecast-interrogator objects. When called, each of these interrogator objects uses a spatial index to determine which observation or forecast location is most appropriate for a given coordinate.

Modifications, additions and deletions may be made to the embodiments described above and shown in the accompanying figures without departing from the scope or spirit of the present invention. For example, while the invention has been discussed in the context of location coordinates, images, videos, maps, television, VizRT®, and other concepts and applications, other media and uses for the principles of the present invention will be apparent, for example, in the context of Web pages, cellular devices, and any other conceivable application where specific point data is used. For example, an embodiment of the present invention is a car navigation system that requests local weather (or weather just ahead of the driver's path) using weather data techniques described herein. In certain embodiments, a computer-readable medium (such as, for example, random access memory or a computer disk) comprises code for carrying out the methods described herein.

The invention claimed is:

1. A method of presenting an image and weather data comprising:
   associating three-dimensional location coordinate information with an image, wherein the three-dimensional location coordinate information comprises a longitude value, a latitude value, and an elevation value;
   sending a request from a client computing device executing a data plug-in for interrogating one or more servers for weather data comprising the three-dimensional location coordinate information, wherein the weather data comprises at least one of observed and derived data associated with recent weather conditions;
   receiving weather data for the three-dimensional location coordinate information, wherein the weather data is determined using the three-dimensional location coordinate information associated with the image to select at least one location for which weather data is stored from amongst a plurality of locations for which weather data is stored, wherein the plurality of locations are each identified by three-dimensional coordinates having a respective longitude value, a respective latitude value, and a respective elevation value;
   comparing the plurality of locations to the three-dimensional location coordinate information of the request to select the at least one location for which weather data is stored, wherein greater significance is attributed to differences in elevation value than to differences in longitude value and latitude value during the comparison; and
   presenting the image and the provided weather data.

2. The method of claim 1, wherein the weather data stored for the plurality of locations comprises weather data retrieved from one or more of at least two different source weather data systems.

3. The method of claim 1, wherein the image comprises a live video recording and the associated location coordinate information comprises coordinates for the location at which the recording occurred.

4. A method of providing weather data to a user comprising:
   providing a user interface comprising a map graphic for the user to identify a location;
   associating three-dimensional location coordinate information with a user identified location, wherein the three-dimensional location coordinate information comprises a longitude value, a latitude value, and an elevation value;
   sending a request for weather data comprising the three-dimensional location coordinate information, wherein the weather data comprises at least one of observed and derived data associated with recent weather conditions;
   receiving weather data for the three-dimensional location coordinate information, wherein the weather data is determined using the three-dimensional location coordinate information associated with the user identified location to select at least one location for which weather data is stored from amongst a plurality of locations for which weather data is stored, wherein the plurality of locations are each identified by three-dimensional coordinates having a respective longitude value, a respective latitude value, and a respective elevation value;
   comparing the plurality of locations to the three-dimensional location coordinate information of the request to select the at least one location for which weather data is stored, wherein greater significance is attributed to differences in elevation value than to differences in longitude value and latitude value during the comparison; and
   providing the weather data to the user.

5. The method of claim 4, wherein the weather data stored for the plurality of locations comprises weather data retrieved from one or more of at least two different source weather data systems.

6. A method of producing a video with near production time weather data comprising:
   receiving an indication of a location specified by three-dimensional location coordinate information, wherein the three-dimensional location coordinate information comprises a longitude value, a latitude value, and an elevation value;
   creating a segment associated with the three-dimensional location coordinate information;
   producing the video by combining captured video images, the segment, and weather data associated with the segment, wherein, while the video images are being captured by a video camera, the weather data is retrieved from a database of weather data using the three-dimensional location coordinate information associated with the segment, wherein the weather data comprises at least one of observed and derived data associated with recent weather conditions;
   retrieving the weather data by comparing the three-dimensional location coordinate information with longitude, latitude, and elevation values of at least one location for which weather data is stored in the database; and
   comparing the three-dimensional location coordination information with the longitude, the latitude and the elevation values of the at least one location to retrieve the weather data, wherein greater significance is attributed to differences in elevation value than to differences in longitude value and latitude value during the comparison.

7. The method of claim 6, wherein the database of weather data comprises weather data retrieved from one or more of at least two different source weather data systems.

8. The method of claim 6, wherein the produced video comprises a single image providing for the simultaneous display of a captured video image, the segment, and the weather data.

9. The method of claim 6, wherein the weather data comprises weather observation data and weather forecast data.

10. The method of claim 6, wherein retrieving the weather data further comprises determining that a three-dimensional location for which weather data is stored in the database is the nearest location to a location identified by the three-dimensional location coordinate information.

11. The method of claim 6, wherein a metric space comprises a set of elements corresponding to the locations for which weather data is stored in the database, and retrieving the weather data further comprises comparing distances in the metric space.

12. The method of claim 11, wherein the metric space is an r-tree.

13. The method of claim 6, wherein the segment is a map.

14. The method of claim 13, wherein the location coordinate information associated with the segment comprises a latitude value and an elevation value associated with a location on the map.

15. A method of producing a video with near production time weather data comprising:

creating a segment associated with three-dimensional location coordinate information, wherein the three-dimensional location coordinate information comprises a longitude value, a latitude value, and an elevation value;

producing the video by combining captured video images, the segment, and weather data associated with the segment, wherein the weather data is retrieved: (a) in response to a user action; (b) from a database of weather data for a plurality of locations for which weather data is stored after being retrieved from one of at least two different source weather data systems; and (c) using the three-dimensional location coordinate information associated with the segment, wherein the weather data comprises at least one of observed and derived data associated with recent weather conditions; and retrieving the weather data by comparing the three-dimensional location coordinate information with longitude, latitude, and elevation values of at least one location for which weather data is stored in the database, wherein greater significance is attributed to differences in elevation value than to differences in longitude value and latitude value during the comparison.

16. The method of claim 15, wherein retrieval of the weather data further comprises determining which three-dimensional location for which data is stored is nearest a location identified by the three-dimensional location coordinate information associated with the segment.

17. The method of claim 15, wherein a metric space comprises a set of elements corresponding to the locations for which weather data is stored in the database, and retrieving the weather data further comprises comparing distances in the metric space.

18. The method of claim 17, wherein the metric space is an r-tree.

19. The method of claim 15, wherein the three-dimensional location coordinate information associated with the segment comprises a latitude value and an elevation value associated with a location on a map.

* * * * *